United States Patent [19]

Lipscher et al.

[11] Patent Number: 4,715,060

[45] Date of Patent: Dec. 22, 1987

[54] DOOR MESSAGE APPARATUS WITH TELEPHONE ANSWERING DEVICE

[76] Inventors: Bernard N. Lipscher; Kevin G. Coleman, both of 1342 Grant Street Station, Pittsburgh, Pa. 15230

[21] Appl. No.: 754,577

[22] Filed: Jul. 15, 1985

[51] Int. Cl.[4] .................. H04M 1/65; G11B 31/00
[52] U.S. Cl. ..................... 379/70; 369/69; 360/12
[58] Field of Search ............. 179/6.01, 6.03, 6.13, 179/6.16, 6.15; 360/12; 379/68, 70, 79, 82

[56] References Cited

U.S. PATENT DOCUMENTS

| | | | |
|---|---|---|---|
| 3,701,850 | 10/1972 | Ando | 179/6.15 |
| 3,811,012 | 5/1974 | Barber | |
| 3,947,641 | 3/1976 | Trell | |
| 4,100,581 | 7/1978 | Slack et al. | 360/12 |
| 4,243,973 | 1/1981 | Sandidge | |

FOREIGN PATENT DOCUMENTS

| | | | |
|---|---|---|---|
| 56-2776 | 1/1981 | Japan | 179/6.01 |
| 868770 | 5/1961 | United Kingdom | 179/6.13 |

Primary Examiner—Raymond F. Cardillo
Assistant Examiner—James E. Tomassini
Attorney, Agent, or Firm—Bernard, Rothwell & Brown

[57] ABSTRACT

A door message apparatus has a control unit which responds to operation of a doorbell switch to connect a door speaker/microphone to an automatic telephone answering and recording machine. The control unit applies a ring signal to the answering machine so that the machine then plays back a prerecorded message which is broadcast to the door caller. After the playback, the door caller may talk into the door speaker/microphone to produce a message which is recorded by the answering machine.

8 Claims, 2 Drawing Figures

DOOR MESSAGE APPARATUS WITH TELEPHONE ANSWERING DEVICE

TECHNICAL FIELD

The present invention relates to systems for automatically playing back prerecorded messages and for recording responses.

PRIOR ART

The prior art contains a number of automatic telephone answering machines which automatically respond to telephone ring signals to answer telephone calls and play recorded messages ending with tones after which the callers may respond with messages which are recorded by the answering machines. These machines are widely available at prices which are affordable by the many of owners and renters of homes, apartments, business establishments, etc. However, the prior art does not contain any similar relatively inexpensive machine which can provide a similar message and recording of a response by someone calling at the door of a home, apartment, business establishment, etc.

SUMMARY OF THE INVENTION

The present invention is summarized in a door answering system employing a conventional automatic telephone answering and recording machine wherein a control unit responds to a doorbell signal to operate the telephone answering and recording machine to broadcast a message from a door speaker and then to record a response.

An object of the invention is to provide an automatic door answering and recording system which has a cost that is affordable by most owners and lessees of homes, apartments, etc.

Another object of the invention is to utilize a conventional telephone answering and recording machine for automatically answering a doorbell and recording a response.

One advantage of the invention is that a conventional automatic telephone answering and recording machine can be utilized both for responding to telephone calls and for answering doorbells.

Other objects, advantages and features of the invention will be apparent from the following description of the preferred embodiment taken in conjunction with the accompanying drawings.

DESCRIPTION OF THE PREFERRED EMBODIMENT

Figure 1:
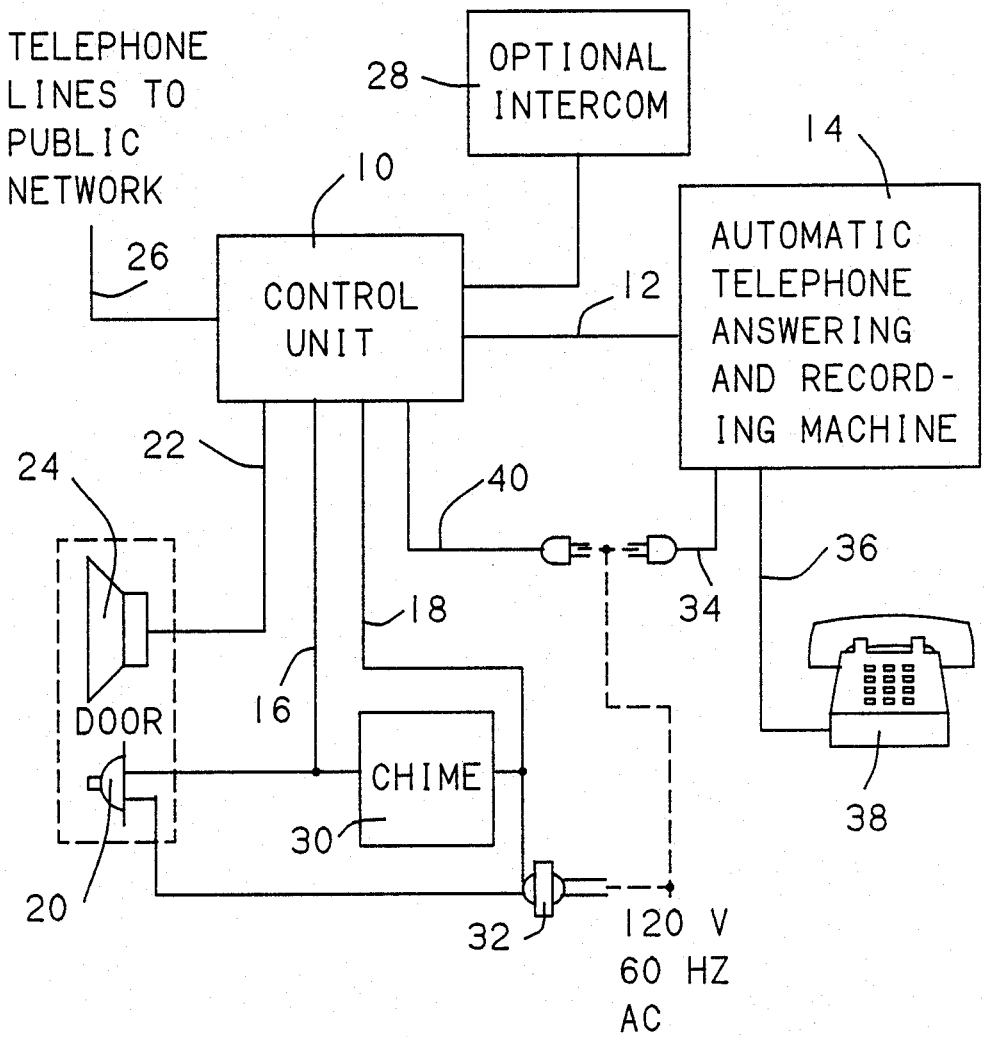
FIG. 1 is a block diagram of a automatic answering and recording system for both telephone and door callers in accordance with the invention.

As shown in FIG. 1, a telephone and doorbell answering and recording system employs a control unit 10 which is connected by a message line or telephone cord 12 to an automatic telephone answering and recording machine 14. A pair of input lines 16 and 18 are connected to a doorbell circuit of a house, apartment, or other establishment. The control unit 10 responds to a depression of a doorbell pushbutton switch 20 operating the doorbell circuit to produce a ring signal on the telephone cord 12 which initiates operation of the automatic telephone answering and recording machine 14. The machine 14 transmits a prerecorded message on the cord 12 which is applied by the control unit 10 to a circuit 22 to a door speaker/microphone 24. After the prerecorded message is broadcast from the door speaker 24, the caller at the doorbell button may respond whereupon audio signals from the speaker microphone 24 are applied by the unit 10 to the telephone cord 12. The telephone answering and recording machine 14 will then automatically record the incoming message on the telephone cord 12.

Optionally the control unit 10 is also connected to telephone lines 26 for normally connecting the telephone lines to the telephone cord 12 and the automatic telephone answering and recording machine 14. Further, an intercom 28 may be connected to the control unit 10 for listening in on the response message from the door speaker/microphone 24.

The doorbell circuit is a conventional circuit for operating a doorbell or a chime 30 and includes a step-down transformer 32 having its primary connected to the conventional power source such as 120 vac 60 Hz power for the home or apartment. The secondary winding of the transformer 32 is connected in series with the normally open doorbell pushbutton switch 20 and the chime 30 for operating the chime 30 when the doorbell pushbutton 20 is depressed. Conveniently, the lines 16 and 18 are connected across the chime 30; however, any other connection to the doorbell circuit suitable for sensing operation of the doorbell switch 20 can be utilized.

The automatic telephone answering and recording machine 14 is any of the widely available telephone answering machines. In the described embodiment, the machine is preferably a type that utilizes preset durations for transmitting a prerecorded message on lines 12, as well as a subsequent selected duration for recording a short return message on the automatic answering machine 14. Power for the machine 14 is supplied through a conventional power cord 34 plugged into the conventional power supply. Additionally, the machine 14 may be of the type having a conventional telephone receptacle for connecting to a telephone cord 36 to a telephone 38 such that the telephone 38 may be utilized to answer an incoming telephone call on lines 26.

Figure 2:
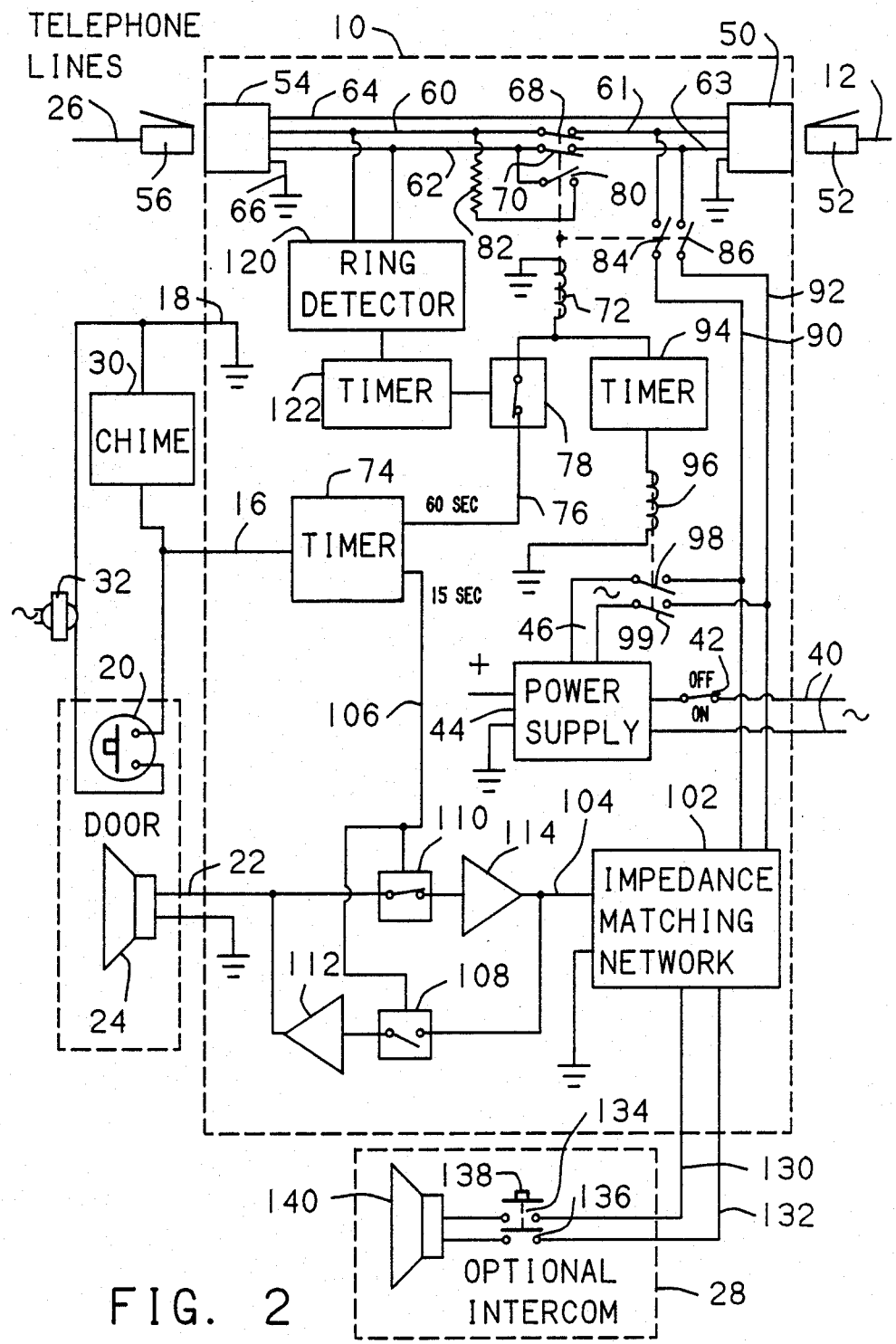
FIG. 2 is a detailed electrical diagram of a control unit employed in the system of FIG. 1.

The control unit 10 has a power cord 40 for connecting the unit to the power source. As shown in FIG. 2, the lines 40 of the power cord in the control unit 10 are connected through an on/off switch 42 to a power supply 44 which produces a suitable DC voltage supply for operating the various components of the unit 10, as well as producing an AC signal on outputs 46, such as from the secondary of an isolation transformer, which meets the specification of a telephone ring signal.

The control unit 10 includes a conventional telephone cord receptacle 50 for receiving and connecting with a conventional telephone plug 52 on the message line 12 which is a conventional telephone cord. Similarly the unit 10 includes a telephone connecter receptacle 54 for receiving and connecting with a telephone line plug 56 on the incoming telephone lines or cord 26. Such telephone cords normally include four wires wherein; as shown for the incoming telephone lines of the unit 10, wires 60 and 62 are the TIP and RING lines, respectively, for carrying ringing signals, dialing signals, and audio signals of the telephone. The other two wires of the telephone cord are a voltage supply line 64 which optionally can be connected to a low voltage supply transformer for powering lights and the like on a telephone instrument, and a ground wire 66. Normally closed contacts 68 and 70 of a relay 72 connect the incoming telephone lines 60 and 62 to message lines 61 and 63 to the receptacle 50. The low voltage and ground lines 64 and 66 are connected directly between the receptacles 50 and 54 so that normally the answer cord 12 is connected to the telephone cord 26. In this condition, the automatic telephone answering and recording machine 14 of FIG. 1 operates in a conventional manner to respond to a RING signal on lines 60 and 62, to transmit audio signals on lines 60 and 62 corresponding to a prerecorded message, and after the end of the outgoing message to record the audio signals on lines 60 and 62 corresponding to an incoming message on the telephone lines 26.

The line 16 from the doorbell circuit is connected to a timer 74 which has a timing output 76 connected through a normally closed electronic switch or relay 78 to the winding of relay 72. The timer 74 produces an output on the line 76 operating the relay 72 for a duration corresponding to the operating time of the telephone answering and recording machine 14. The relay 72 also includes normally open contacts which are connected in series with a low impedance 82 across the incoming telephone lines 60 and 62. The impedance 82 has a low value producing an off-hook condition on the lines 60 and 62 so that the telephone system will indicate that the telephone line 26 is busy should a telephone caller dial the line 26 during the time that the timer 74 operates the relay 72. The relay 72 also includes normally open contacts 84 and 86 which connect the RING and TIP lines 61 and 63 from the message cord 12 to lines 90 and 92. The normally closed contacts 68 and 70 and the normally open contacts 84 and 86 may either be separately switched contacts of the relay 72 or the respective normally closed and normally open contacts of double throw contactor switches of the relay 72.

The timer line 76 is also connected through the switch 78 to an input of a timer 94 which operates a relay 96 for closing normally open contacts 98 and 99 to connect the RING signal lines 46 to the lines 90 and 92. The timer 94 is selected to operate for a duration sufficient to activate the automatic telephone answering and recording machine 14.

The lines 90 and 92 are connected through an impedance matching network 102 to a door audio line 104. The timer 74 also produces an output on line 106 which corresponds to the playback duration of the telephone answering machine 14 in transmitting the prerecorded message on the message line 12. The line 106 is connected to a control input of a normally open electronic switch or relay 108 and to the control input of a normally closed electronic relay or switch 110. The switch 108 is connected in series with an amplifier 112 between the door audio line 104 and the line 22 to the door speaker microphone 24 so that during the playback duration the outgoing message from the telephone answering machine 14 is broadcast by the speaker 24. The switch 110 is connected in series with an amplifier 114 between the line 22 and the audio line 104, so that after the playback duration, the speaker/microphone 24 operates as a microphone to produce audio signals on line 104 of a incoming message by the person pressing the doorbell switch 20, which message can be then recorded by the telephone answering machine 14.

A RING detector circuit 120 is connected across the telephone lines 60 and 62 from the input receptacle 54 and has an output operating a timer 122 when an incoming RING signal is detected on the telephone lines 26. The timer 122 operates the switch or relay 78 to prevent the relay 72 from operating in response to operation of the door pushbutton switch 20. The timer 122 has a suitable timing period for holding the switch 78 open for the duration that the automatic telephone answering and recording machine 14 plays back the prerecorded message and records an incoming message on the telephone lines 26.

The optional intercom 28, for one embodiment as shown in FIG. 2, has a pair of lines 130 and 132 from the impedance matching network 102 which are connected in series with respective normally open contacts 134 and 136 to inputs of a speaker 140. The impedance matching network 102 connects the lines 130 and 132 to the lines 90 and 92 so that upon depression of the pushbutton switch 138 the audio signals on the lines 90 and 92 will be broadcast from the speaker 140.

In operation of the door message system of FIGS. 1 and 2, the depression of the doorbell pushbutton 120, in addition to operating the chime 30, activates the timer 74. The output 76 of the timer 74 operates relay 72 which opens the contacts 68 and 70 to disconnect the incoming telephone lines 60 and 62 from the outgoing telephone lines 61 and 63 in the message line 12 to the telephone answering machine 14. Operation of the relay 72 also closes contacts 84 and 86 to connect the lines 61 and 63 and hence the telephone answering machine to lines 90 and 92. Timer 94 is operated by the signal on line 76 to operate relay 96 and close contacts 98 and 99 and apply a RING signal to the lines 90 and 92. This RING signal on lines 90 and 92 is applied to the telephone answering machine 14 to activate the playback and recording cycle of the machine.

During the playback period of the machine 14 the output 106 of timer 74 operates switches 108 and 110 to disconnect the amplifier 114 and to connect the amplifier 112 between lines 104 and 22. The amplifier 112 suitably amplifies or buffers the audio signal on line 104 as applied by the impedance matching network 102 from lines 90 and 92 so that the speaker/microphone 24 will broadcast the prerecorded message from the telephone answering machine 14 to the caller pressing the doorbell pushbutton switch 20. After the prerecorded message has been broadcast, the timer 74 discontinues the signal on lines 106 which results in the opening of the switch 108 and the closing of switch 110. Thus, the line 22 from the speaker/microphone 24 is applied to the input of amplifier 114 so that the audio signals produced by the caller speaking into the speaker microphone 24 are applied to line 104 and hence to lines 90 and 92 and the automatic telephone answering recording machine 14 for being recorded by the machine.

Since many variations, modifications and changes in detail may be made to the above described telephone and door message system without departing from the scope and spirit of the invention, it is intended that all matter described in the foregoing description and shown in the accompanying drawings be interpreted only as illustrative of one possible embodiment of the invention and not as limiting on the invention which is defined in the following claims.

What is claimed is:

1. A control unit for a combination telephone and door message apparatus, comprising a message line, means for connecting the message line to an automatic telephone answering and recording mechanism which responds to a ring signal on the message line to generate electrical audio signals on the message line by playing a prerecorded outgoing message and then to record electrical audio signals of an incoming message from the message line;

telephone line disconnecting means for normally connecting the message line to a telephone line such that the message playback and recording mechanism responds to a ring signal on the telephone line to transmit the prerecorded outgoing message on the telephone line and to record an incoming message from the telephone line;

door connecting means, normally disconnected from the message line, for connecting the message line to door speaker and microphone means to broadcast the outgoing message on the door speaker and microphone means and to generate the incoming message on the message line from the door speaker and microphone means;

means adapted for connection to a doorbell switch to sense operation of the doorbell switch; and means responsive to the sensing of the operation of the doorbell switch including means for operating the telephone line disconnectiong means to disconnect the telephone line from the message line, means for operating the door connecting means to connect the door speaker and microphone means to the message line, and means for generating a ring signal on the message line so that the automatic telephone answering and recording mechanism operates to transmit the prerecorded outgoing message over the message line to the door speaker and microphone means and to record a subsequent message on the message line from the door speaker and microphone means.

2. A control unit as claimed in claim 1 wherein said means responsive to sensing of the operation of the doorbell switch includes means for connecting a low impedance across the telephone line to indicate an off-hook status.

3. A control unit as claimed in claim 1 including a ring detector for sensing a ring signal on the telephone line, and means responsive to the ring detector sensing a ring signal on the telephone line for disabling the means responsive to the sensing of the operation of the doorbell switch to prevent interruption of the transmission and recording of outgoing and incoming messages on the telephone line.

4. A door message apparatus as claimed in claim 1 wherein the means responsive to sensing of the operation of the doorbell switch includes timing means for operating the telephone line disconnecting means and the door connecting means for a predetermined duration.

5. A combination telephone and control unit comprising an automatic telephone answering and recording machine for responding to a ring signal on a pair of telephone lines to transmit a prerecorded outgoing message on the telephone lines and then to record an incoming message on the telephone lines;

a doorbell switch;

door speaker and microphone means; and a control unit connected to the pair of telephone lines, the automatic telephone answering and recording machine, the doorbell switch, and the door speaker microphone means;

said control unit including means normally connecting the pair of telephone lines to the automatic telephone answering and recording machine so that the telephone answering and recording machine can respond to a ring signal on the telephone line, can transmit the prerecorded outgoing message on the telephone lines, and can record a subsequent incoming message on the telephone lines; and said control unit also including means responsive to operation of the doorbell switch for disconnecting the automatic telephone answering and recording machine from the telephone lines, for connecting the automatic telephone answering and recording machine to the door speaker and microphone means, and for generating and transmitting a ring signal to the automatic telephone answering and recording machine so that the automatic telephone answering and recording machine transmits the prerecorded outgoing message to the door speaker and microphone means and can record a subsequent incoming message on the telephone lines.

6. A door message apparatus as claimed in claim 5 wherein said means responsive to operation of the doorbell switch includes means for connecting a low impedance across the telephone line to indicate an off-hook status.

7. A door message apparatus as claimed in claim 5 including a ring detector for sensing a ring signal on the telephone line, and means responsive to the ring detector sensing a ring signal on the telephone line for disabling the means responsive to operation of the doorbell switch to prevent interruption of the transmission and recording of outgoing and incoming messages on the telephone lines.

8. A door message apparatus as claimed in claim 5 wherein the means responsive to operation of the doorbell switch includes timing means for operating the telephone line disconnecting and the door connecting means for a predetermined duration.

* * * * *